Feb. 12, 1963  J. J. WOMPEY  3,077,531
ELECTRIC HEATER

Filed Sept. 2, 1958  2 Sheets-Sheet 2

INVENTOR.
JOHN J. WOMPEY
BY
Anderson, Spangler & Wymore
ATTORNEYS

United States Patent Office 3,077,531
Patented Feb. 12, 1963

3,077,531
ELECTRIC HEATER
John J. Wompey, 2500 15th St., Denver, Colo.
Filed Sept. 2, 1958, Ser. No. 758,398
5 Claims. (Cl. 219—39)

This invention relates to a forced air heater and more particularly to an improved electric heater of the type having means incorporated therein for circulating air heated thereby throughout the space desired to be heated.

It is an important object of the present invention to provide an improved electric forced air heater which will provide maximum efficiency in transforming electric energy supplied thereto into thermal energy suitable for heating the space in which the heater is located.

Electric heaters, heretofore in use, have been unsatisfactory and inefficient for several reasons. Those which rely on radiation as the sole means of distributing heat into the area to be heated have little or no effect outside of the immediate vicinity of the heating apparatus. Where such devices are placed in large rooms, close proximity to the heater is necessary in order for any warmth to be derived therefrom. In those types of heaters which incorporate means for forcing air over the heating element, the movement of the air in sufficient quantity to provide reasonable circulation produces cooling of the heating element to an extent that the efficiency is greatly impaired. Further, if the air is moved only or partially through the rays of the heating element substantially no heating of the air takes place in this manner.

It is a further object of the invention to provide an improved electric heater in which the rays from the heater element are employed to supply heat to storage means for efficient transfer of the heat to forced air passing thereover.

An additional object of the invention is to provide a novel reflector design which will effect a more efficient transfer of heat from the heater element to the storage means and provide a uniform heating thereof.

It is also an object of the invention to provide an electric heater structure that is not only highly efficient, but which is rugged and durable. In addition, an electric heater embodying all the advantages above set forth may be manufactured easily, the assembly thereof being accomplished quickly with very little labor or expense.

For a better understanding of the present invention, together with other and further objects thereof, reference is had to the following description taken in connection with the accompanying drawing and its scope will be pointed out in the appended claims.

Figure 1:
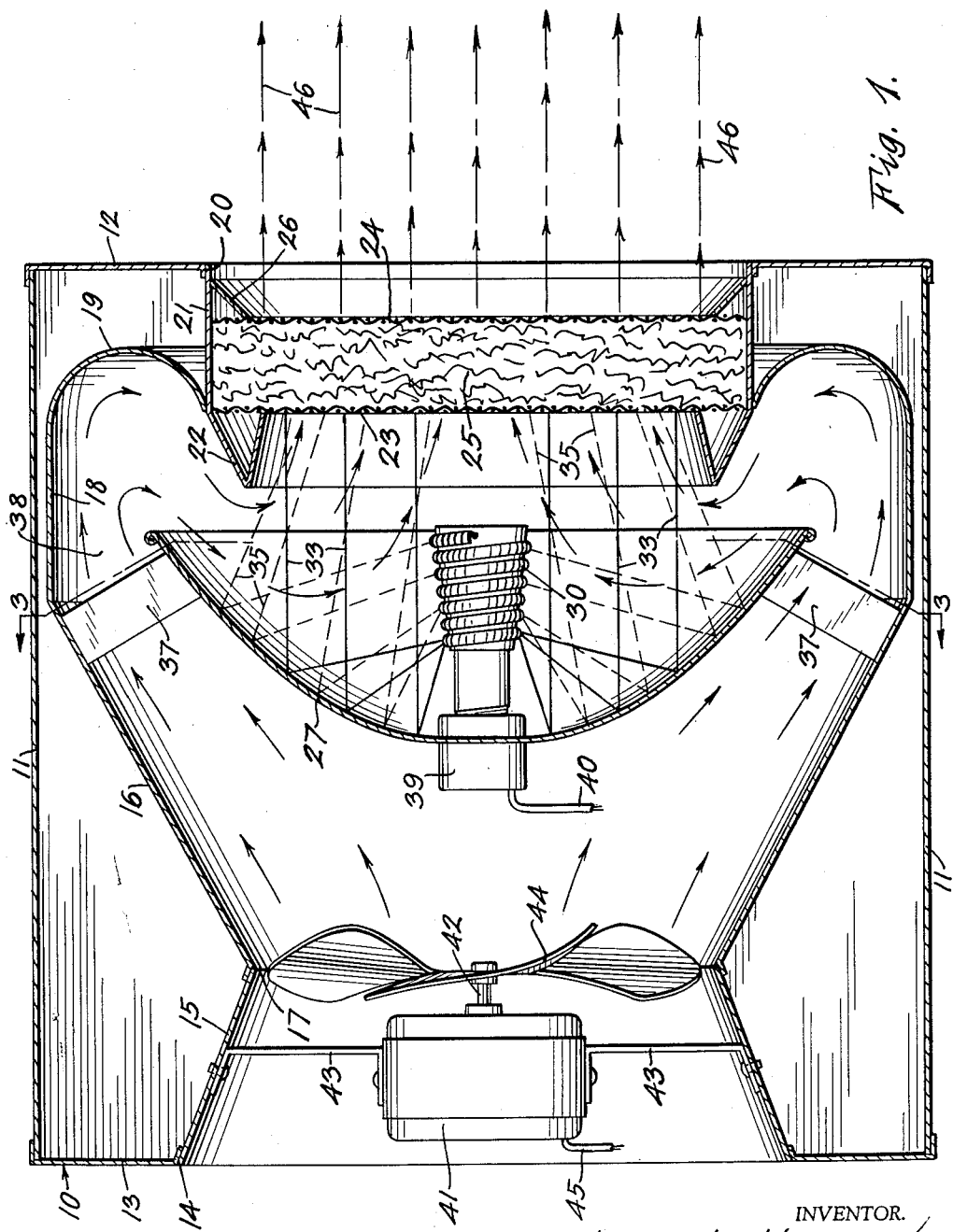
FIGURE 1 is a side elevational view, in section, of the heater according to the invention.
Figure 2:
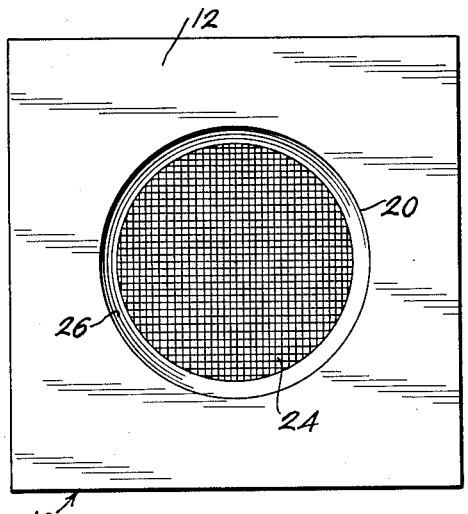
FIGURE 2 is a front view of the heater.

In the particular embodiment of the invention shown in the drawings, casing 10 which forms a covering for the heater also serves as a base for supporting the heater on a surface as a floor and the like. Casing 10 is seen to be comprised principally of a rectangular section 11, forming the top, bottom and sides. The ends of the rectangular section 11 are made up of a front end plate 12 and a rear end plate 13 secured to section 11 by any convenient means. Rear plate 13 is seen to be provided with a central opening 14 of generally circular configuration comprising an air inlet opening. A first rearwardly flaring truncated conical section 15 has its largest diameter secured to plate 13 in mating relation with opening 14. A second forwardly flaring truncated conical section 16 is attached and secured to section 15 with its smaller diameter mating with the smaller diameter thereof to form a throat 17 of smaller diameter than the balance of either section. The combination of sections 15, 16 and throat 17 producing a venturi configuration. The forward and larger diameter of section 16 has connected thereon annular ring 18, the front or forwardmost edge is provided with an inward reverse bend forming an annulus. Front plate 12 is provided with an air outlet opening 20 of generally circular configuration and a cylindrical section 21 is attached thereto of a size and positioned to mate with opening 20. Cylindrical section 21 is seen to extend rearwardly from opening 20 a distance sufficient to mate with and join the inner edge of reverse bend 19 of annular ring 18. The juncture of reverse bend 19 and cylindrical section 21 serves to provide support for the front of the inner assembly within casing 10. Rearwardly of this juncture, cylindrical section 21 may be provided with an integral reverse bend 22 of generally triangular cross section with apex of the triangle positioned toward the rear of case 10. The annular ring formed by reverse bend 22 may also conveniently be formed separately and attached to cylindrical section 21 by suitable means. A screen 23 is positioned within the opening defined by cylindrical section 21 adjacent the base of the triangular annular ring formed by reverse bend 22. Another screen 24 is spaced from screen 23 within the opening defined by cylindrical section 21. The space between screens 23 and 24 is filled with metallic wool 25, such as steel or copper wool. The wool 25 may be conveniently blackened by chemical or other means to increase heat absorption. The wool forms the heat storage means of the heater. An annular ring 26 of conical section is positioned within the cylindrical section 21 and frictionally engages same to hold screen 24, wool 25 and screen 23 in place.

Figure 4:
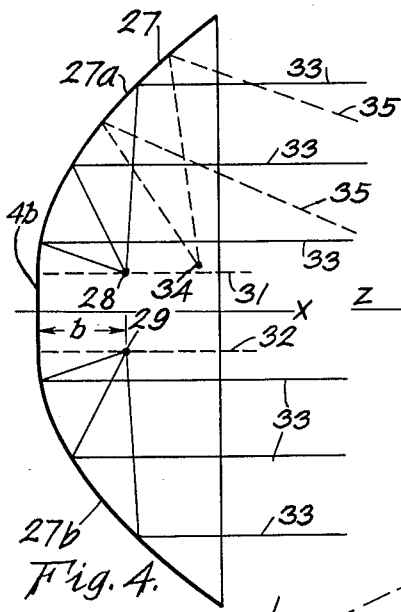
FIGURE 4 is a diagrammatic illustration of a reflector designed to focus on a circular heater element for most effective transfer of heat from the heater element to a storage means.

Referring to FIGURES 1 and 4, reflector 27 of generally parabolic configuration is designed particularly for use with a source of wave energy which radiates from a surface which is generally circular and covers a substantial area. Most reflectors for use with a circular type heater element are designed to focus from a "pin point." The present invention is described in terms of a heater which utilizes a heater element which is generally circular and covers a substantial area. The area will vary depending on the size and wattage of a particular heater element. The heater coil 30 is preferably supported on a truncated conical support, of ceramic or other heat resisting material, such that the coils increase in diameter as further removed from reflector 27. A heating coil of this shape produces a crossing of the cross-rays 35 with parallel rays 33 closer to the reflector than a cylindrical shape. A single coil may be used as the heater element or the coil may be supported on a cylindrical shaped support to less advantage. It will be appreciated that as the wattage of a heater coil is increased, the support may be required to be larger in diameter, however, it is preferred that the support for the heater coil not be increased in length or the reflector increased in depth. This may be accomplished conveniently by proper choice of the shape of the conical support for the heater coil 30 for a particular parabolic cross section of reflector 27.

Figure 6:
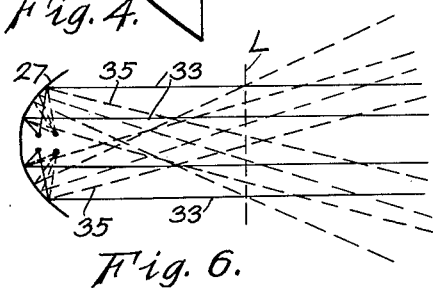
FIGURE 6 is a diagrammatic showing of the path of a number of cross-rays relative to parallel rays emanating from a reflector according to the invention to illustrate the preferred positioning of the heat storage means relative to the reflector and heater element.

The parabolic cross section of reflector 27 and the shape of the heater coil are chosen to produce a uniformly distributed concentration of rays, i.e. parallel and cross-rays, upon an area immediately in front of the reflector no larger than the reflector. The heat storage means 25 is positioned in front of the reflector, preferably immediately in front, as shown in FIGURE 1, but may be positioned at points between reflector 27 and outer limit L, FIGURE 6, where the cross-rays 35 begin to diverge from the beam defined by parallel rays 33. When the relationship of the shape of the heater coil and curve of reflector 27 is arrived at to produce the foregoing condition, the heater element may be increased in size and wattage as by increasing the diameter of the heater coil retaining the same shape and increasing similarly the foci of the parabolic curves making up the reflector. With a heater element whose lowermost coil is, say, an inch and one-half in diameter, reflector 27 is constructed with the sides being parabolic curves and the axes thereof being spaced apart diametrically an inch and one-half forming a circle. Where the lowest coil is two inches in diameter, the reflector will have curves whose axes are spaced to form a two inch circle. It will be understood that the particular pattern which the axes of the parabolic curves will form may be varied to accommodate other shapes of heater elements, i.e. square, elliptical.

Applying this description to FIGURE 4, dots 28 and 29 represent in cross section the lowermost coil of a heater element 30. The reflector 27 is also shown in cross section as comprising two parabolic curves 27a and 27b with axes respectively indicated by dotted lines 31 and 32 and the focus of each curve being at the portion 28 and 29 of the lowermost coil of heater 30. Lines 33 indicate heat rays radiating from the focal points to the reflector and reflected therefrom in parallel lines.

The heat rays from portions of the coil indicated by dot 34, further removed from the reflector 27, are represented as dotted lines 35 and are seen to be directed at various angles depending on the positioning of 34 from the reflector. The rays will be reflected generally toward the center line of the reflector, FIGURE 6, such that all of the radiation from the heater element 30 will be directed onto a surface placed in front of the reflector, intermediate said reflector and limit L, having an area no larger than the area defined by the circumference of the reflector. In the particular embodiment of the reflector, shown in FIGURES 4 and 5, each parabolic curve is seen to focus from the periphery of a circle as indicated by dotted line 36, having a radius, "$a$," positioned at a distance "$b$," along the X axis, from a planar projection 46 of the circle located centrally of the reflector surface with which an axis of every parabolic curve making up the reflector intersects.

Figure 5:
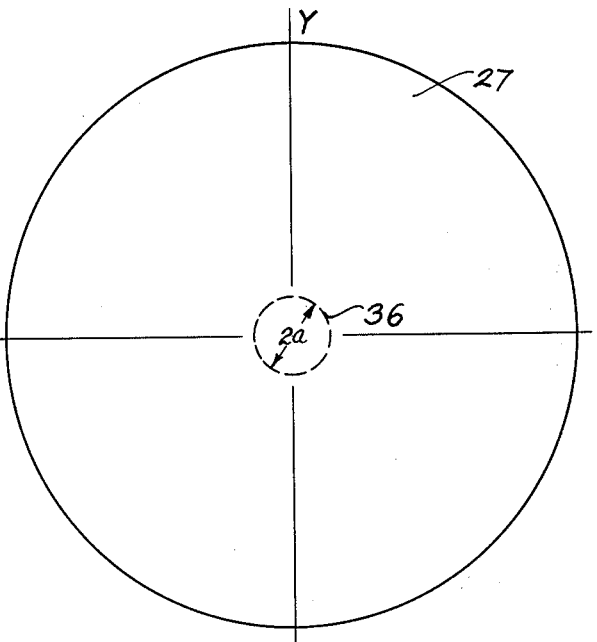
FIGURE 5 is a frontal view of the reflector constructed in accordance with the teaching of this invention.

Thus, in the form shown in FIGURES 4 and 5, the locus of foci of the parabolic curves making up the reflector surface is in the shape of a circle 36 and each parabolic curve intersects tangentially a flat disc 46 having the same radius as circle 36. The formula for the reflector surface of this invention can be shown to be a parabolic generation equated to (1) $$Y^2 + Z^2 = (a + \sqrt{4bx})^2$$

where: $a$ is the radius of the locus of foci; and $b$ is the distance of the locus of foci from a planar projection thereof in the surface of the reflector and located centrally thereof.

It is an important aspect of the present invention that the heat storage means 25 be positioned within that area in front of reflector 27 where cross-rays 35 intersect parallel rays 33 and preferably at points where there is substantially a uniform distribution of such rays over the surface thereof. Positions immediately in front of reflector 27 and in the immediate vicinity of line L are seen to provide the most uniform distribution patterns of the parallel rays and cross-rays, 33 and 35 respectively, within an area no laregr than the reflector. The positioning of heat storage means 25 at these positions will provide the most uniform heating thereof, however, the heat storage means may be positioned intermediate these extremities with substantial success.

Figure 3:
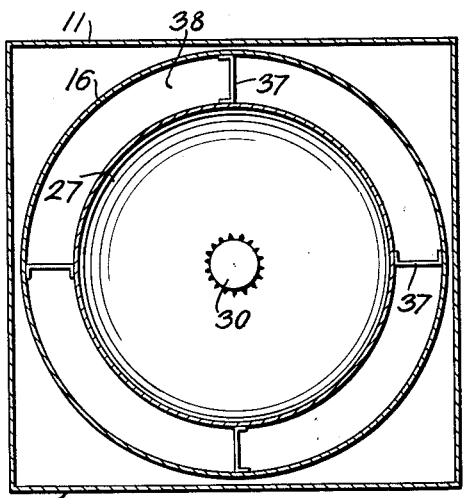
FIGURE 3 is a view along line 3—3 of FIGURE 1.

Referring to FIGURES 1 and 3, reflector 27 is mounted centrally within conical section 16 and supported therein by means of struts 37. The edge reflector is seen to be spaced from annular section 18 such that the area of the opening 38 therebetween is at least as great and preferably greater than the area of throat 17 between conical sections 15 and 16. An electric socket 39 is positioned centrally in reflector 27 and heater element 30 is inserted therein. An electrical cord 40 is connected to socket 39 to supply electric current thereto from a source of electrical current through a control switch, not shown.

An electric motor 41 with shaft 42 is mounted centrally within conical section 15 by means of motor brackets 43. A fan 44 is attached to shaft 42 and positioned within throat 17. The fan 44 is preferably formed from a disc cut and bent to produce a gentle pushing of air through throat 17. An electric cord 45 is connected to motor 41 to supply electric current from a source of electrical current through a control switch, not shown.

In operation, when current is supplied to heater element 30 the radiant energy produced thereby is reflected by reflector 27 onto the metallic wool 25 and is absorbed thereby raising the temperature of the metallic wool. Current is supplied to motor 41 which energizes and drives fan 44 forcing air through throat 17 and around the outer surface of reflector 27. The air flow is then reversed by reverse bend 19 and passes around triangular ring 22 in substantially out-of-contact relation with heater element 30 to pass out through the metallic wool, as shown by the arrows. The air in passing through the wool absorbs heat therefrom heating the air, which heated air passes out the front of the heater along dotted lines 46 into the space to be heated.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A heater apparatus comprising a casing having an air inlet opening and an air outlet opening, conduit means between said inlet and outlet openings comprising a first frusto-conical section connected to said inlet opening such that the walls thereof flare inwardly of the casing, a second frusto-conical section having outwardly flaring walls connected to said first frusto-conical section remote of said inlet opening, the juncture of said first and second sections defining a venturi throat, a cylindrical conduit connected to the air outlet opening extending inwardly into the casing, a cylindrical section connected to the forward edge of the outwardly flaring walls of said second frusto-conical section provided with a circular reverse bend to produce an opening sized to mate with the cylindrical conduit connected to said outlet opening, heat storage means comprising a blanket of metallic wool positioned within said cylindrical conduit and across said outlet opening, reflector means with heater element mounted centrally within the conduit means and positioned to direct radiation from said heater element onto said heat storage means and means for drawing air into the casing through said inlet opening, forcing it around the reflector means in substantially out-of-contact relation with the heater element and in heat exchange relation with said heat storage means and causing it to flow out of the casing through said air outlet opening.

2. Heating apparatus as set forth in claim 1, wherein the reflector means is sized and positioned such that the area of the space between the reflector means and the conduit means is at least as great as the area of the venturi throat.

3. Heating apparatus in accordance with claim 1, wherein the heater element comprises heating coils and the reflector means is one having sides of the same parabolic cross section but interrelatively spaced apart a distance substantially equal to the diameter of the lowermost coil of the heating element.

4. Heating apparatus in accordance with claim 1, wherein the reflector means is adapted to reflect rays from the heater element to converge in front of the reflector and the heating means is positioned with respect to the heat storage means such that the heat storage means is located intermediate said reflector and the point of convergence of the rays.

5. Heating apparatus according to claim 3, wherein said reflector is adapted to reflect rays from a coil of said heating element most closely adjacent the reflector in parallel fashion and reflect rays from those coils further removed from the reflector to converge in front of the reflector, cross the parallel rays and diverge from the pattern of parallel rays remote of said reflector, said heating means further being positioned with respect to the heat storage means such that the heat storage means is located intermediate said reflector and the point of divergence of the cross-rays from the pattern of the parallel rays.

References Cited in the file of this patent

UNITED STATES PATENTS

| | | |
|---|---|---|
| 1,705,812 | Fisher | Mar. 19, 1929 |
| 1,706,846 | Fisher | Mar. 26, 1929 |
| 2,073,582 | Morse | Mar. 9, 1937 |
| 2,257,366 | Bates et al. | Sept. 30, 1941 |
| 2,443,983 | Gustafson et al. | June 22, 1948 |
| 2,613,328 | Embshoff et al. | Oct. 7, 1952 |
| 2,771,001 | Gretener | Nov. 20, 1956 |
| 2,846,565 | Binkley et al. | Aug. 5, 1958 |

FOREIGN PATENTS

| | | |
|---|---|---|
| 99,717 | Switzerland | June 16, 1923 |
| 349,741 | Great Britain | June 4, 1931 |